United States Patent
Kotary et al.

(10) Patent No.: US 11,556,327 B2
(45) Date of Patent: *Jan. 17, 2023

(54) SOC-ASSISTED RESILIENT BOOT (71) Applicant: Intel Corporation, Santa Clara, CA (US)

(72) Inventors: Karunakara Kotary, Portland, OR (US); Michael Kubacki, Hillsboro, OR (US); Sean Dardis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/988,976

(22) Filed: Aug. 10, 2020

(65) Prior Publication Data

US 2021/0096840 A1  Apr. 1, 2021

Related U.S. Application Data (63) Continuation of application No. 15/998,801, filed on Aug. 16, 2018, now Pat. No. 10,740,084.

(51) Int. Cl.
*G06F 8/65* (2018.01)
*G06F 9/4401* (2018.01)
(Continued)

(52) U.S. Cl.
CPC ............... *G06F 8/65* (2013.01); *G06F 8/654* (2018.02); *G06F 8/66* (2013.01); *G06F 9/4401* (2013.01); *G06F 21/44* (2013.01); *G06F 21/57* (2013.01); *G06F 21/575* (2013.01); *G06F 8/71* (2013.01); *G06F 21/12* (2013.01); *G06F 21/566* (2013.01); *G06F 21/572* (2013.01);
(Continued)

(58) Field of Classification Search
CPC ... G06F 8/65; G06F 8/654; G06F 8/66; G06F 8/71; G06F 21/44; G06F 21/57; G06F 21/575; G06F 21/64; G06F 21/74; G06F 9/4401; G06F 21/572; G06F 21/12; G06F 21/82; G06F 21/78; G06F 21/577; G06F 21/566

See application file for complete search history.

(56) References Cited

U.S. PATENT DOCUMENTS 8,590,040 B2   11/2013   Ghetie et al.
8,904,162 B2   12/2014   Futral et al.
(Continued)

OTHER PUBLICATIONS

E. Gallery et al., Trusted Mobile Platforms, 2007, [Retrieved on Aug. 24, 2022], Retrieved from the internet: <URL: http://nozdr.ru/data/media/biblio/kolxoz/Cs/CsLn/F/Foundations%20of%20Security%20Analysis%20and%20Design%204%20conf.,%20FOSAD%202006-2007%20Tutorial%20Lectures(LNCS467> 43 Pages (282-323) (Year: 2007).*

(Continued)

*Primary Examiner* — Anibal Rivera
(74) *Attorney, Agent, or Firm* — Jordan IP Law, LLC (57) ABSTRACT

Systems, apparatuses and methods may provide for technology that assumes, by a root of trust located in a trusted region of a system on chip (SOC), control over a reset of the SOC and conducting, by the root of trust, an authentication of an update package in response to an update condition. The root of trust technology may also apply the update package to firmware located in non-volatile memory (NVM) associated with a microcontroller of the SOC if the authentication is successful.

21 Claims, 9 Drawing Sheets (51) Int. Cl.
*G06F 21/44* (2013.01)
*G06F 21/57* (2013.01)
*G06F 8/654* (2018.01)
*G06F 21/74* (2013.01)
*G06F 21/64* (2013.01)
*G06F 8/71* (2018.01)
*G06F 21/78* (2013.01)
*G06F 21/56* (2013.01)
*G06F 21/82* (2013.01)
*G06F 21/12* (2013.01)

(52) U.S. Cl.
CPC ............ *G06F 21/577* (2013.01); *G06F 21/64* (2013.01); *G06F 21/74* (2013.01); *G06F 21/78* (2013.01); *G06F 21/82* (2013.01)

(56) References Cited

U.S. PATENT DOCUMENTS

| | | | |
|---|---|---|---|
| 9,223,982 | B2 | 12/2015 | Adams et al. |
| 9,842,212 | B2 | 12/2017 | Oxford |
| 9,858,412 | B2 | 1/2018 | Kotary et al. |
| 10,025,600 | B2 | 7/2018 | Ehrenberg et al. |
| 10,083,306 | B2 | 9/2018 | Smith et al. |
| 10,262,140 | B2 | 4/2019 | Smith et al. |
| 2012/0167205 | A1 | 6/2012 | Ghetie et al. |
| 2014/0040605 | A1 | 2/2014 | Futral et al. |
| 2014/0250291 | A1 | 9/2014 | Adams et al. |
| 2015/0235029 | A1* | 8/2015 | Morishige ............ G06F 21/572 713/1 |
| 2016/0125187 | A1 | 5/2016 | Oxford |
| 2016/0378976 | A1 | 12/2016 | Kotary et al. |
| 2016/0378996 | A1 | 12/2016 | Smith et al. |
| 2017/0090909 | A1* | 3/2017 | Guo .................... G06F 21/57 |
| 2017/0097830 | A1 | 4/2017 | Ehrenberg et al. |
| 2017/0177872 | A1* | 6/2017 | McLean .............. G06F 9/4401 |
| 2017/0187752 | A1* | 6/2017 | Schulz ................ H04L 63/0263 |
| 2017/0308705 | A1 | 10/2017 | Karaginides et al. |
| 2017/0351862 | A1 | 12/2017 | Mohinder et al. |
| 2018/0004953 | A1* | 1/2018 | Smith, II ................ G06F 21/57 |
| 2018/0089436 | A1 | 3/2018 | Smith et al. |
| 2019/0073478 | A1 | 3/2019 | Khessib et al. |

OTHER PUBLICATIONS

Regenscheid, Andrew, "Platform Firmware Resiliency Guidelines", NIST, May 2018, 45 pages.

Office Action for U.S. Appl. No. 15/998,801, dated Jun. 25, 2019, 16 pages.

Office Action for U.S. Appl. No. 15/998,801, dated Oct. 30, 2019, 17 pages.

* cited by examiner

SOC-ASSISTED RESILIENT BOOT

CROSS-REFERENCE TO RELATED APPLICATIONS

This application is a continuation of and claims priority to U.S. patent application No. 15,998,801 filed on Aug. 16, 2018, now U.S. Pat. No. 10,740,084.

TECHNICAL FIELD

Embodiments generally relate to boot firmware resiliency. More particularly, embodiments relate to system on chip (SOC)-assisted resilient booting of computing devices.

BACKGROUND

A system BIOS (basic input/output system) is typically a program (e.g., firmware/FW) that a central processing unit (CPU) uses to start up a computing device when it is turned on. The system BIOS may also manage data flow between the operating system (OS) of the computing device and attached devices such as a hard disk drive, video adapter, keyboard, mouse, printer, and so forth. Attacks on, or damage to, the system BIOS can have a detrimental effect on the overall computing device. While solutions to rendering system BIOS resilient to attacks and damage may exist, there remains considerable room for improvement. For example, modern computing devices may contain system on chip (SOC) architectures with many microcontrollers, where each microcontroller stores boot firmware that is also subject to attack or damage.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
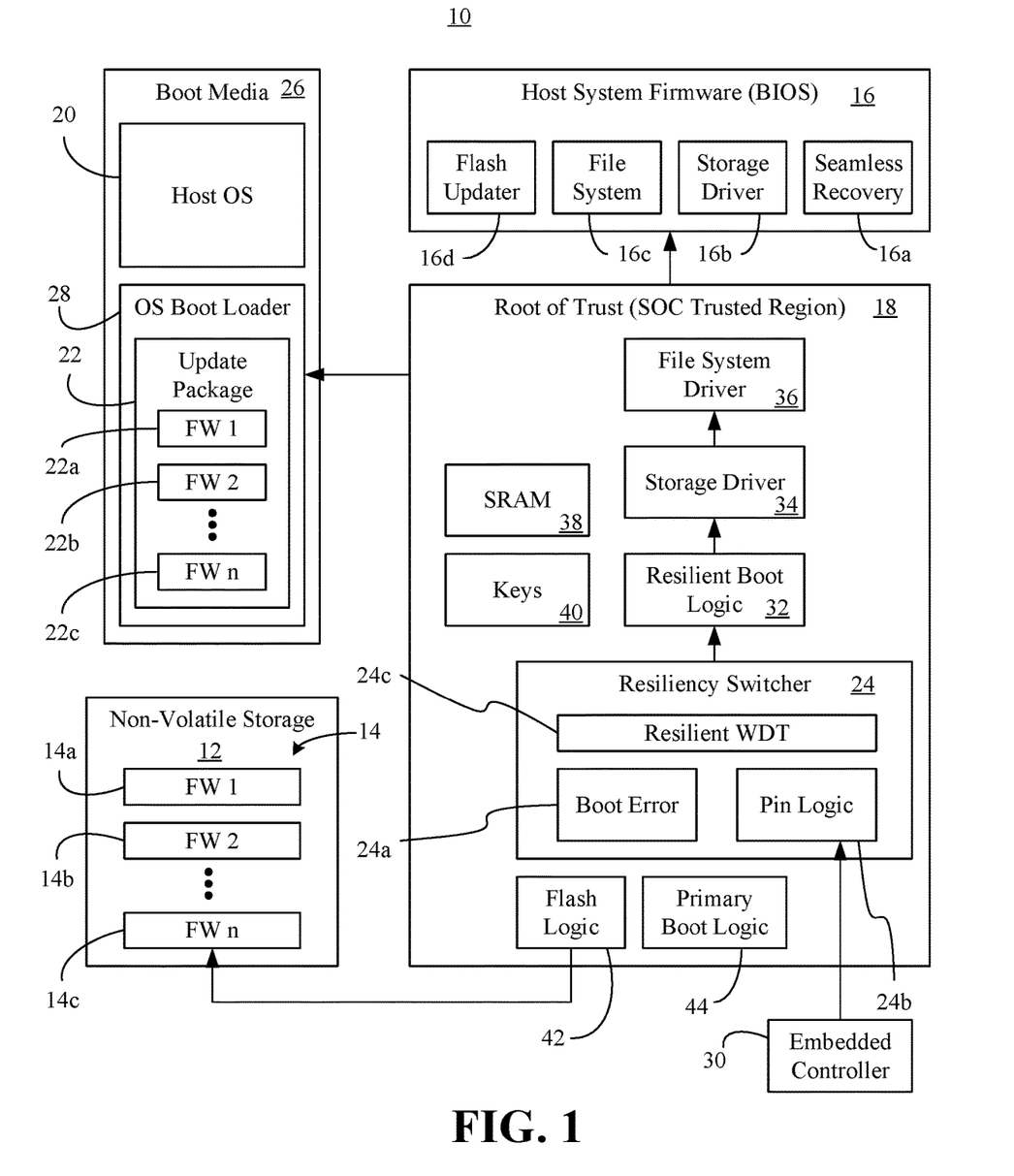
FIG. 1 is a block diagram of an example of a system architecture according to an embodiment.

Turning now to FIG. 1, a system architecture 10 is shown in which host system firmware 16 (16a-16d, e.g., BIOS) is used to boot and operate a computing device that includes the system architecture 10. In the illustrated example, a non-volatile storage 12 (e.g., Serial Peripheral Interface NOR/SPINOR, Embedded Multimedia Card/eMMC, Universal Flash Storage/UFS, Peripheral Components Interconnect Non-Volatile Memory Express, PCI NVMe, or other NVM) contains a plurality of firmware components 14 (14a-14c), where the firmware components 14 are also used to boot and operate the computing device.

The illustrated host system firmware 16 includes seamless recovery firmware 16a to request a recovery of one or more of the firmware components 14 by setting a firmware recovery flag (e.g., FW_RECOVERY_BIT) and a storage driver 16b to update non-critical portions of the firmware components 14 when a non-critical flag (e.g., NON_CRITICAL_BOOT_FIRMWARE_UPDATE) flag is asserted/set. The host system firmware 16 may also include a file system 16c (e.g., file allocation table/FAT system driver) that operates in conjunction with the storage driver 16b to identify a partition in boot media 26 (e.g., hard disk drive/HDD, optical disc, solid state drive/SSD, flash memory) that contains an update package 22 (22a-22c). The illustrated host system firmware 16 also includes a flash updater 16d to update the non-critical portions of the firmware components 14 on the non-volatile storage 12. As will be discussed in greater detail, a root of trust 18 may accelerate updates to the critical portions of the firmware components 14.

In one example, the computing system includes a system on chip (SOC) having a plurality of microcontrollers (e.g., host processor/CPU, graphics processor, high speed memory interface, high speed serial interface, display interface, media interface, processor core, cache controller, etc.), and one or more of the firmware components 14 correspond to one or more of the microcontrollers. Thus, a first firmware component 14a may correspond to a graphics processor on the SOC, a second firmware component 14b might correspond to a high speed serial interface on the SOC, a third firmware component 14c may correspond to a display controller on the SOC, and so forth.

In the illustrated example, the architecture 10 includes a root of trust 18 that is located in a trusted region of the SOC and cannot be corrupted. The root of trust 18 may generally be implemented in the SOC as logic instructions stored in a read only memory (ROM), configurable logic, fixed-functionality hardware logic, etc., or any combination thereof. As will be discussed in greater detail, the root of trust 18 assumes control from, for example, a host operating system (OS) 20, over resets of the SOC, conducts an authentication of the update package 22 in response to the presence of update conditions (e.g., update flag and/or recovery flag being set), and applies boot critical portions of the update package 22 to the firmware components 14 if the authentication is successful. The illustrated root of trust 18 accelerates the application of the update package 22 to boot critical portions of the firmware components 14. In an embodiment, the boot media 26 includes the host OS 20, which writes the update package 22 to an OS boot loader 28 in a partition (e.g., FAT32 and/or globally unique identifier partition table/GPT partition).

More particularly, the illustrated root of trust 18 includes a resiliency switcher 24 (24a-24c) that has a coalesced set of external triggers used to achieve resiliency in system recovery flows. For example, a boot error module 24a may detect a corruption in the host system firmware 16, pin logic 24b may detect user driven inputs signaled via an embedded controller 30 to general purpose IO (GPIO) pins of the SOC, a resilient watchdog timer (WDT) 24c may expire if a critical system operation (e.g., BIOS code execution or non-ROM based system firmware update) fails, and so forth.

Resilient boot logic 32 reacts to the stimulus from the resiliency switcher 24 by triggering a storage driver 34 to access the partition (e.g., GPT_FW_UPDATE_PARTITION) containing the update package 22. In one example, the storage driver 34 includes stack technology that supports serial advanced technology attachment (SATA), NVMe, eMMC and/or UFS communications. A file system driver 36 manages the retrieval of the update package 22 from the partition on the boot media 26. In one example, the firmware retrieval flow includes the use of static random access memory (SRAM) 38 as a buffer area and authentication keys 40 (e.g., public hash RSA keys embedded in ROM or an in-field programmable/IFP fuse array at design or manufacturing time) to authenticate payloads of the update package 22. The keys 40 may also be capable of being updated in a secure manner in the field. If the authentication is successful, flash logic 42 updates the critical portions of the firmware components 14 on the non-volatile storage 12. In one example, primary boot logic 44 performs the primary responsibilities of the root of trust 18 for system boot operations.

Enabling the root of trust 18 to perform the firmware updates may provide a number of significant advantages. For example, bill of materials (BOM) costs and area are reduced by eliminating a second (or larger) SPINOR flash to store a second copy of the critical boot firmware. Additionally, the user experience is enhanced by eliminating the use of a tethered USB (Universal Serial Bus) connection and another computing device during in-field seamless recovery. Indeed, performance is enhanced by achieving reliable recovery of both critical and non-critical portions of the firmware components 14.

Additionally, integrating the file system driver 36 within the SOC trusted region provides a hardware-rooted trust for the firmware update operation independent of firmware boot chain verification technologies supported by the host system firmware 16. Moreover, integrating the illustrated file system driver 36 within the SOC trusted region enables high assurance of in-field firmware updates even if the early boot critical portion of the firmware components 14 have been corrupted. The illustrated solution also enables the host system firmware 16 to be updated without actually containing the logic to perform the update (e.g., offering a simple and secure firmware update option).

The illustrated solution may also be applied as an alternative approach to provisioning the host system firmware 16 for the first time onto the non-volatile storage 12. More particularly, the boot media 26 might be prepared with the update package 22 already in the partition. Once the system is assembled and ready for provisioning, the boot media 26 may be added to the system. When the system powers up for the first time, it would be strapped to recovery mode and enter the root of trust update flow described herein. The root of trust update flow detects the update package 22 and applies the update to the system as part of the first system boot. Such an approach eliminates any need for a programming tool to directly update the firmware flash (e.g., DEDI-PROG). The result is cost and time savings associated with eliminating the tool.

Figure 2:
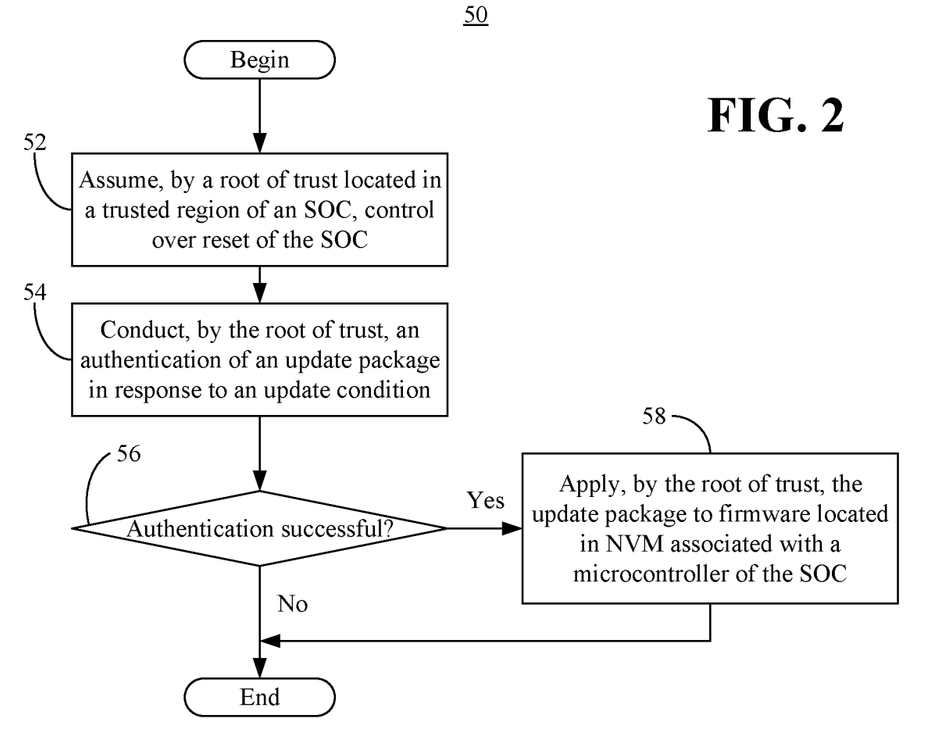
FIG. 2 is a flowchart of an example of a method of operating a system on chip (SOC) according to an embodiment.

FIG. 2 shows a method 50 of operating an SOC. The method 50 may generally be implemented in an SOC root of trust such as, for example, the root of trust 18 (FIG. 1), already discussed. In an embodiment, the method 50 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 assumes, by a root of trust located in a trusted region of an SOC, control over reset of the SOC. As already noted, the trusted region may be a ROM, configurable logic, fixed-functionality hardware and/or IFP fuse array of the SOC, which also includes a plurality of microcontrollers. Block 54 conducts, by the root of trust, an authentication of an update package in response to an update condition. The update condition may include an update flag being set, a recovery flag being set, etc., or any combination thereof. In one example, the authentication is conducted with a public key such as, for example, one or more of the keys 40 (FIG. 1), that are programmed into the SOC at design or manufacturing time. Block 54 may also include retrieving, by the root of trust, the update package from a partition in a boot media that contains an OS of the SOC.

In an embodiment, block 56 determines whether the authentication is successful. If so, illustrated block 58 applies, by the root of trust, the update package to firmware located in non-volatile memory (NVM) associated with a microcontroller of the SOC. Block 58 may include clearing, by the root of trust, one or more of the update flag or the recovery flag in response to the update package being successfully applied to the firmware. If the authentication is unsuccessful, block 58 is bypassed in the illustrated example. In one example, the control over the reset is assumed at block 52 from the OS of the SOC. In such a case, block 58 includes transferring control over the reset back to the OS in response to the update package being successfully applied to the firmware.

Figure 3A:
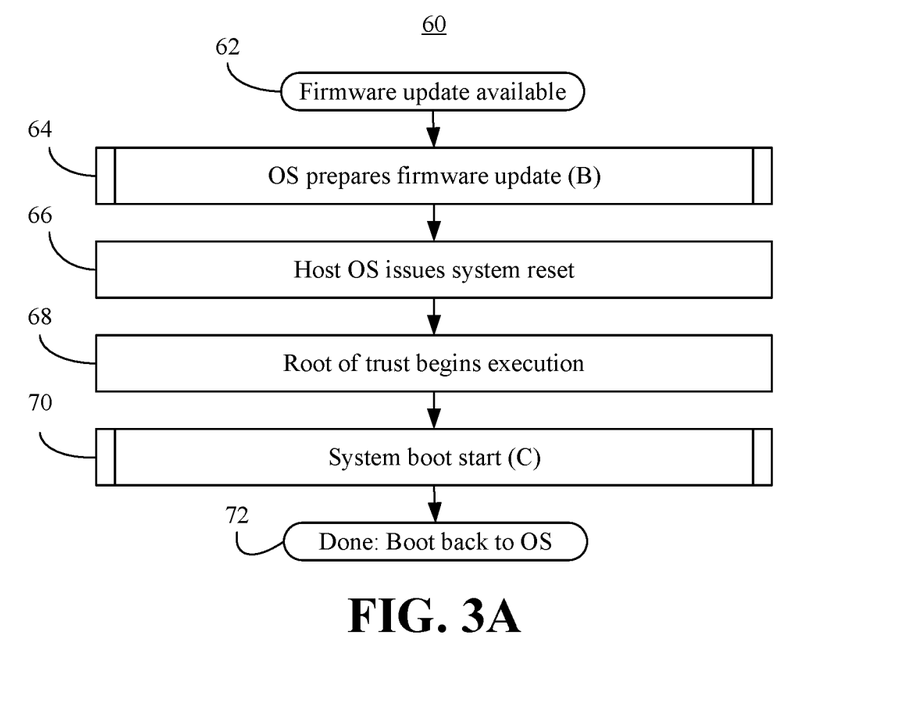
FIGS. 3A-3E are flowcharts of examples of methods of managing a boot flow according to an embodiment.

FIG. 3A shows a method 60 of managing a boot flow. The method 60 may generally be implemented in a system architecture such as, for example, the architecture 10 (FIG. 1), already discussed. More particularly, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Figure 3B:
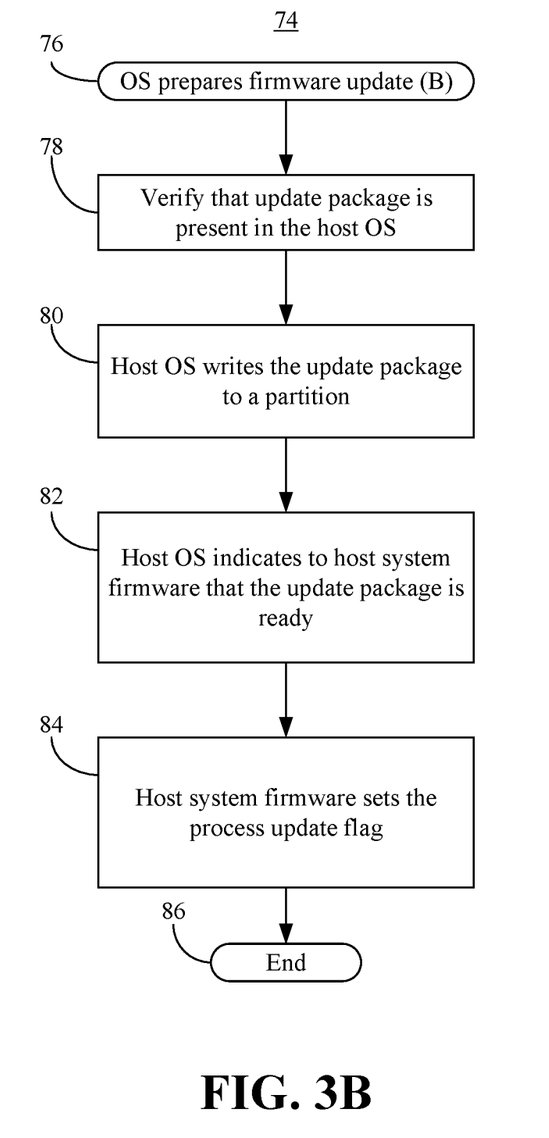

In the illustrated example, a firmware update is available at block 62 and the OS prepares the firmware update at block 64 (see, e.g., Firmware Update Preparation Sub-Process, FIG. 3B). The host OS may issue a system reset at block 66, where an SOC root of trust (e.g., FW_UPDATE_ROOT_OF_TRUST) begins execution at block 68. Illustrated processing block 70 performs a system boot start (see, e.g., System Boot Start Sub-Process, FIG. 3C), where boot control is transferred back to the OS at block 72.

Firmware Update Preparation Sub-Process ("B")

FIG. 3B shows a method 74 of preparing a firmware update. The method 74 may be readily substituted for block 64 (FIG. 3A), already discussed. More particularly, the method 74 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

In the illustrated example, the sub-process begins at block 76. A verification of the presence of the update package in the host OS (e.g., HOST OPERATING SYSTEM) is conducted at block 78, where the host OS writes the update package to a partition at block 80. Additionally, the host OS may indicate to the host system firmware (e.g., HOST SYSTEM FIRMWARE) at block 82 that the update package is ready. In an embodiment, the host system firmware sets a process update flag (e.g., PROCESS UPDATE BIT) at block 84 and the method 74 terminates at block 86. The detail of the process update flag may be abstracted from the host OS by an entity such as, for example, a unified firmware extensible interface (UEFI) runtime service or other runtime firmware component.

Figure 3C:
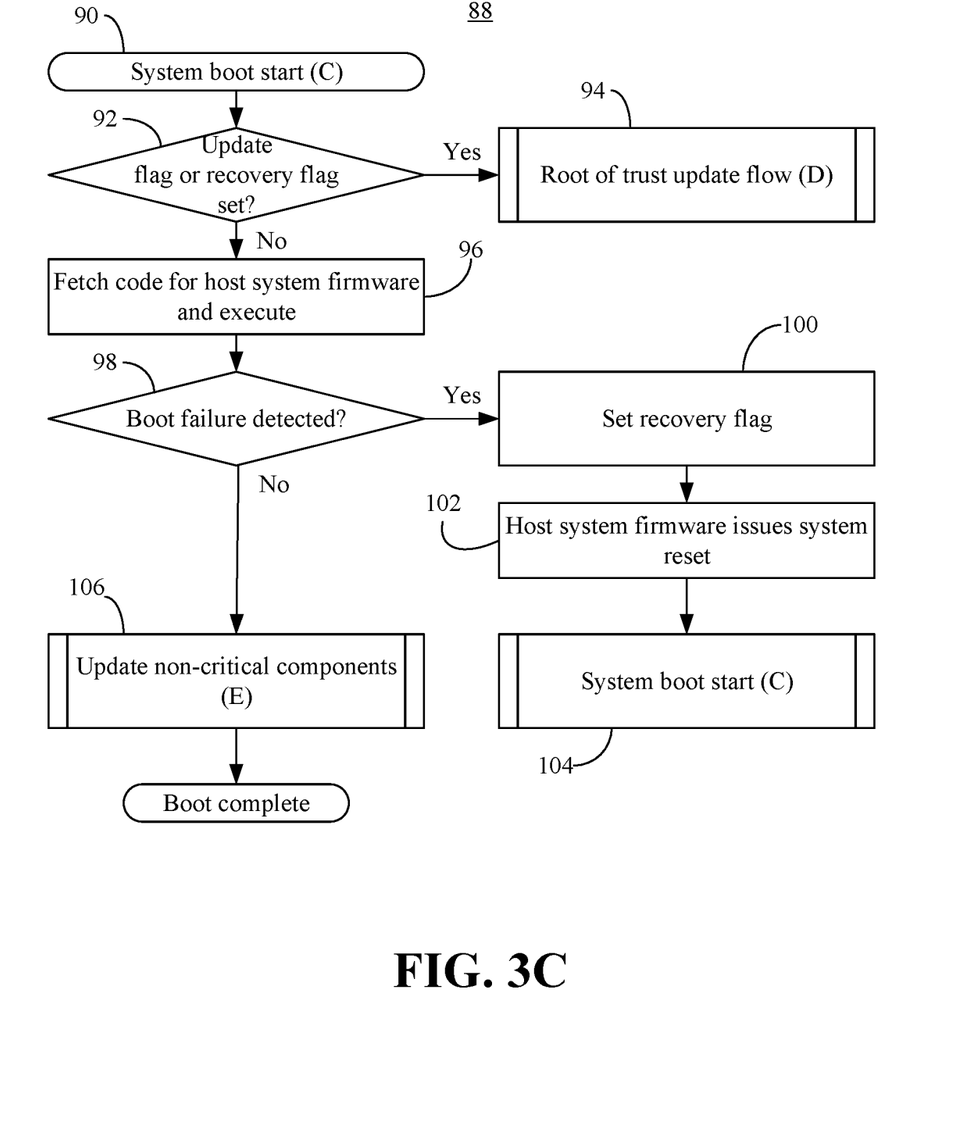

System Boot Start Sub-Process ("C")

FIG. 3C demonstrates that once the SOC root of trust begins execution at block 68 (FIG. 3A), a system boot start sub-process begins at block 90 of a method 88. The method 88 may therefore be readily substituted for block 70 (FIG. 3A), already discussed. More particularly, the method 88 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 92 determines whether an update flag (e.g., PROCESS UPDATE BIT) or a recovery flag (e.g., FW_RECOVERY_BIT) is set (e.g., whether an update condition exists). If so, the illustrated method 88 proceeds to a root of trust update flow at block 94 (see, e.g., Root of Trust Update Sub-Process, FIG. 3D).

Figure 3D:
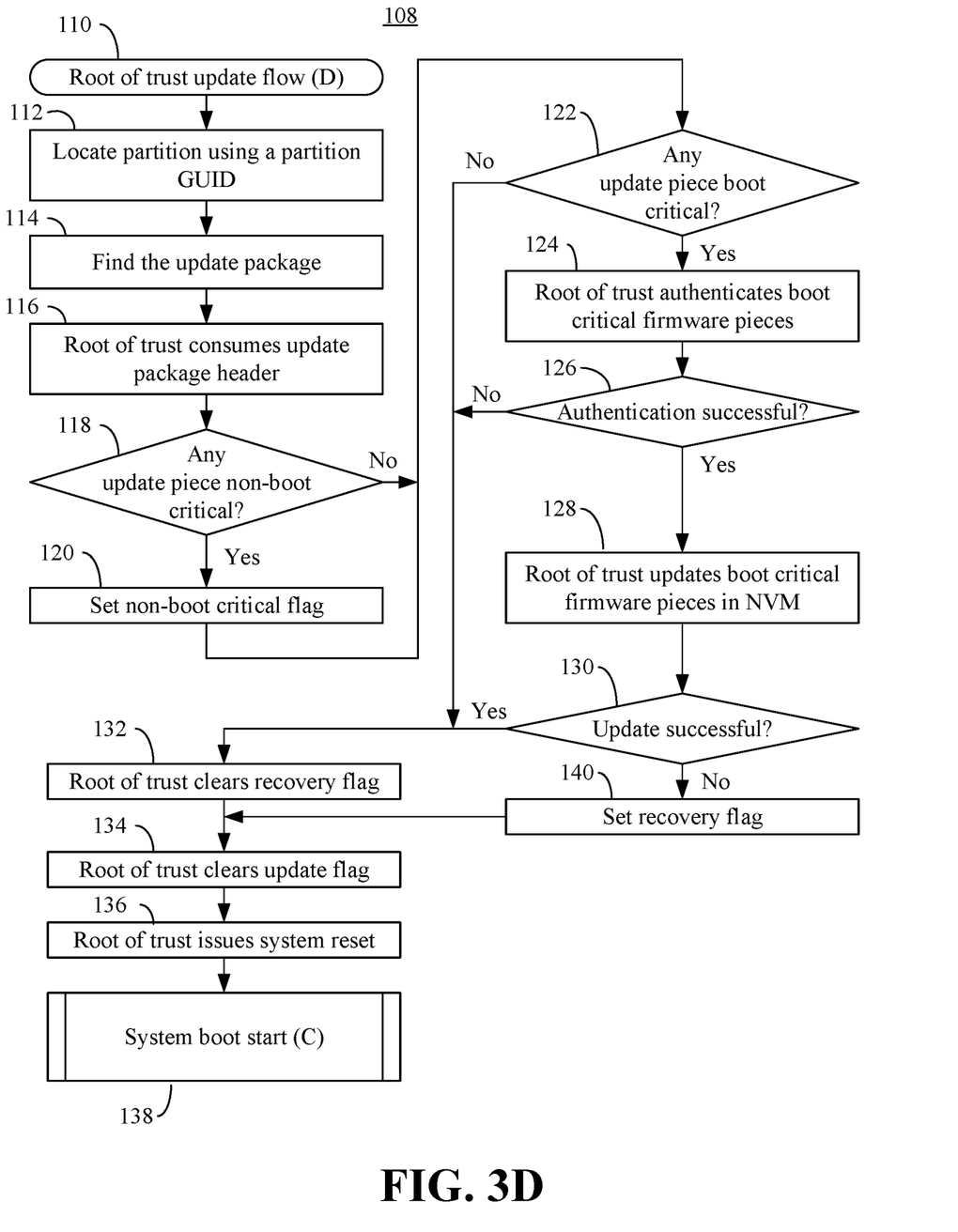
Figure 3E:
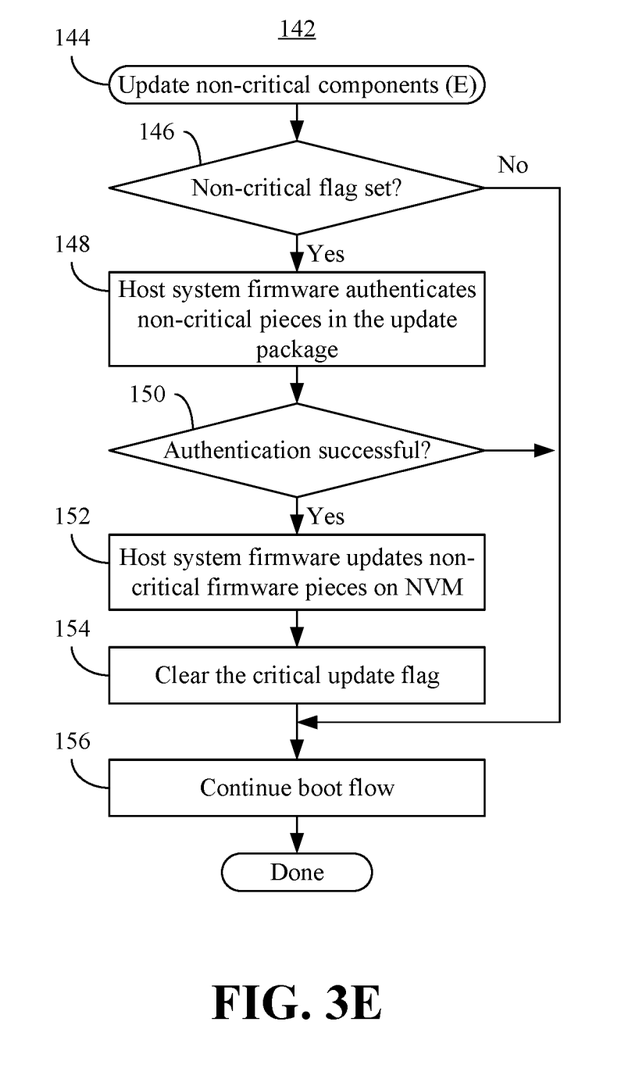

If neither the update flag nor the recovery flag are set, code for the host system firmware is fetched and executed at illustrated block 96. In one example, a determination is made at block 98 as to whether a boot failure is detected. If so, the recovery flag may be set at block 100, where the host system firmware issues a system reset at block 102. The method 88 may then repeat itself at block 104. If it is determined at block 98 that a boot failure is not detected, illustrated block 106 updates non-critical components (see, e.g., Non-Critical Update Sub-Process, FIG. E).

Root of Trust Update Sub-Process ("D")

FIG. 3D shows a method 108 of conducting a root of trust update flow. The method 108 may be readily substituted for block 94 (FIG. 3C), already discussed. More particularly, the method 108 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

In the illustrated example, the sub-process begins at block 110. A partition (e.g., GPT_FW_UPDATE_PARTITION) is located at block 112 using a partition GUID (globally unique identifier, e.g., GPT_FW_UPDATE_PARTITION_GUID). In one example, the partition GUID is a fuse that is provisioned during manufacturing of the SOC. Illustrated block 114 finds the update package in the partition. In an embodiment, the root of trust consumes a header of the update package at block 116. The update package header may include file size information, non-boot critical information, boot critical information, etc., or any combination thereof. A determination is made at illustrated block 118 as to whether any update piece/portion is non-boot critical. If so, block 120 sets a non-boot critical flag (e.g., NON_BOOT_CRITICAL_UPDATE_BIT). If not, block 120 is bypassed. The illustrated method 108 then determines at block 122 whether any update piece/portion is boot critical. If so, block 124 conducts, by the root of trust, an authentication of the boot critical firmware update pieces (e.g., in the FwFileName, as an example of the update package that is on the partition).

A determination may be made at block 126 as to whether the authentication was successful. If the authentication was successful, the root of trust applies the boot critical pieces of the update package to the firmware located in the NVM at block 128. Illustrated block 130 determines whether the update was successful. If so, the root of trust clears the recovery flag in the SOC at block 132. The root of trust may also clear the update flag at block 134 and issue a system reset at block 136. The illustrated method 108 then returns to the system boot start sub-process at block 138.

If it is determined at block 122 that none of the update pieces are boot critical, the method 108 bypasses blocks 124, 126 and 128 and proceeds directly to block 132. Additionally, if it is determined at block 130 that the update was not successful, illustrated block 140 sets the recovery flag and the method 108 bypasses block 132.

Non-Critical Update Sub-Process ("E")

FIG. 3E demonstrates that if a boot failure is not detected at block 98 (FIG. 3C), a non-critical update sub-process begins at block 144 of method 142. The method 142 may therefore be readily substituted for block 106 (FIG. 3C), already discussed. More particularly, the method 142 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 146 determines whether the non-critical flag is set. If so, the host system firmware authenticates the non-critical pieces of the update package at block 148. Block 150 determines whether the authentication was successful. If so, the host system firmware may update the non-critical firmware pieces on the NVM at block 152. Illustrated block 154 clears the critical update flag, where the boot flow continues at block 156. If it is determined at block 146 that the non-critical flag is not set, the method 142 bypasses blocks 146, 148, 150, 152 and 154. If it is determined at block 150 that the authentication was unsuccessful, the method 142 may bypass blocks 152 and 154. Table I below provides a summary of the resource terminology and example purposes described herein.

TABLE I

| Resource | Purpose |
| --- | --- |
| FW_UPDATE_PACKAGE | The file placed on the disk that contains the firmware update. |
| GPT_FW_UPDATE_PARTITION | The partition that stores the FW_UPDATE_PACKAGE. |
| GPT_FW_UPDATE_PARTITION_GUID | A GUID set in the SOC during manufacturing time that contains the GUID of the GPT_FW_UPDATE_PARTITION. |
| FW_UPDATE_ROOT_OF_TRUST | SOC internal and immutable logic (e.g., ROM) that executes prior to any system firmware. Contains the logic to process firmware updates on disk. |
| PROCESS_UPDATE_BIT | Indicates that a FW_UPDATE_PACKAGE is on GPT_FW_UPDATE_PARTITION and should be processed by the FW_UPDATE_ROOT_OF_TRUST. In one example, this bit is only cleared by the root of trust. |
| HOST_OPERATING_SYSTEM | The system software that executes on the Host CPU that manages computer hardware and software that executes on the Host CPU. |
| HOST_SYSTEM_FIRMWARE | A firmware that performs hardware initialization and tests the primary system components required for system functionality. An example is UEFI FW or BIOS. This firmware may provide runtime services to the Host OS. |
| FW_RECOVERY_BIT | Indicates to the FW_UPDATE_ROOT_OF_TRUST that it should update the firmware due to system recovery. |
| NON_BOOT_CRITICAL_UPDATE_BIT | Indicates to the HOST_SYSTEM_FIRMWARE that it should process a FW_UPDATE_PACKAGE. |
| NON_VOLATILE_STORAGE | A non-volatile storage device such as SPINOR that is used to store HOST_SYSTEM_FIRMWARE. |

The illustrated solution therefore supports in-field seamless recovery and boot resiliency. The illustrated solution also enables a simple, secure, and scalable firmware update solution within the SOC root of trust. Additionally, the solution may save BOM cost by leveraging the high capacity of secondary storage disks in the pre-firmware environment while providing high boot firmware reliability and functional safety. Moreover, the illustrated solution provides "fast full" firmware by performing the update in the ROM prior to system firmware execution and reducing the occurrence of system resets. In addition, an option is provided to reduce tool cost and time on the manufacturing line and update the system firmware as part of the first boot of the system.

Figure 4:
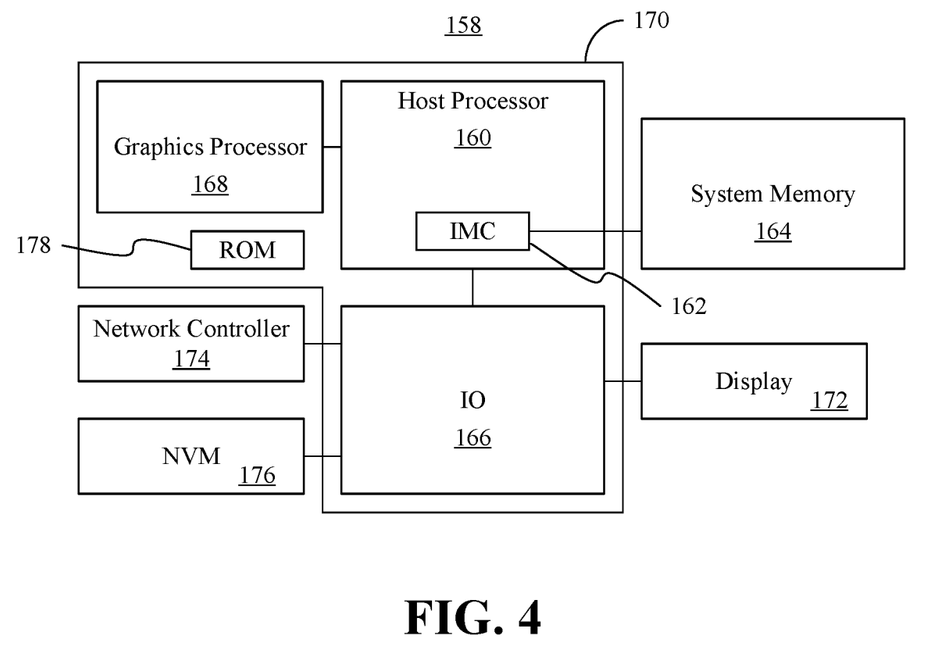
FIG. 4 is a block diagram of an example of a computing system according to an embodiment.

Turning now to FIG. 4, a resiliency-enhanced computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 158 includes a host processor 160 (e.g., CPU with one or more processor cores) having an integrated memory controller (IMC) 162 that is coupled to a system memory 164.

The illustrated system 158 also includes a graphics processor 168 (e.g., graphics processing unit/GPU) and an input output (IO) module 166 implemented together with the processor 160 (e.g., as microcontrollers) on a semiconductor die 170 as a system on chip (SOC), where the IO module 166 may communicate with, for example, a display 172 (e.g., touch screen, liquid crystal display/LCD, light emitting diode/LED display), a network controller 174 (e.g., wired and/or wireless), and mass storage 176 (e.g., HDD, optical disc, SSD, flash memory or other NVM). The illustrated SOC 170 includes a ROM 178 with logic instructions, which when executed by the host processor 160 or other embedded controller (e.g., converged security and manageability engine/CSME) of the SOC 170, cause the computing system 158 to perform one or more aspects of the method 50 (FIG. 2), the method 60 (FIG. 3A), the method 74 (FIG. 3B), the method 88 (FIG. 3C), the method 108 (FIG. 3D), and/or the method 142 (FIG. 3E), already discussed.

Thus, the illustrated SOC 170 uses the ROM 178 to assume, by a root of trust located in the ROM 178, control over a reset of the SOC 170, conduct, by the root of trust, an authentication of an update package in response to an update condition, and apply, by the root of trust, the update package to firmware located in the mass storage 176 associated with a microcontroller of the SOC if the authentication is successful. The ROM 178 may be considered a trusted region that cannot be corrupted. In one example, the ROM 178 is replaced with configurable logic and/or fixed-functionality hardware logic that also represents a trusted region of the SOC 170.

Figure 5:
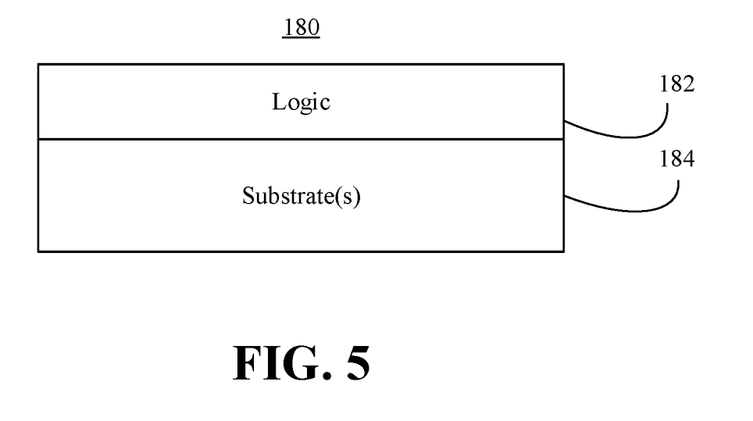
FIG. 5 is an illustration of an example of a semiconductor apparatus according to an embodiment.

FIG. 5 shows a semiconductor package apparatus 180. The illustrated apparatus 180 includes one or more substrates 184 (e.g., silicon, sapphire, gallium arsenide) and logic 182 (e.g., transistor array and other integrated circuit/IC components) coupled to the substrate(s) 184. In one example, the logic 182 is implemented at least partly in configurable logic or fixed-functionality logic hardware. The logic 182 may implement one or more aspects of the method 50 (FIG. 2), the method 60 (FIG. 3A), the method 74 (FIG. 3B), the method 88 (FIG. 3C), the method 108 (FIG. 3D), and/or the method 142 (FIG. 3E), already discussed. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 6:
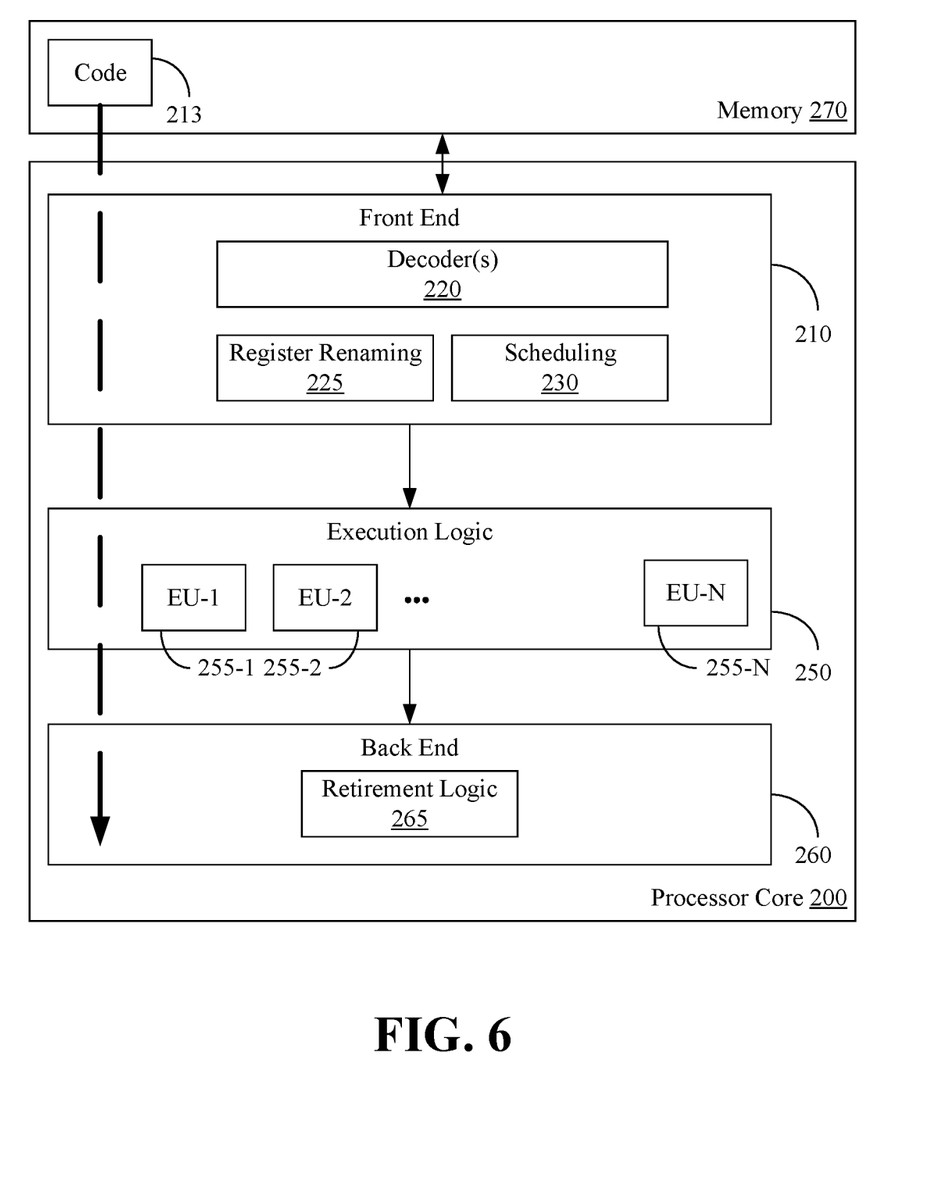
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 50 (FIG. 2), the method 60 (FIG. 3A), the method 74 (FIG. 3B), the method 88 (FIG. 3C), the method 108 (FIG. 3D), and/or the method 142 (FIG. 3E), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
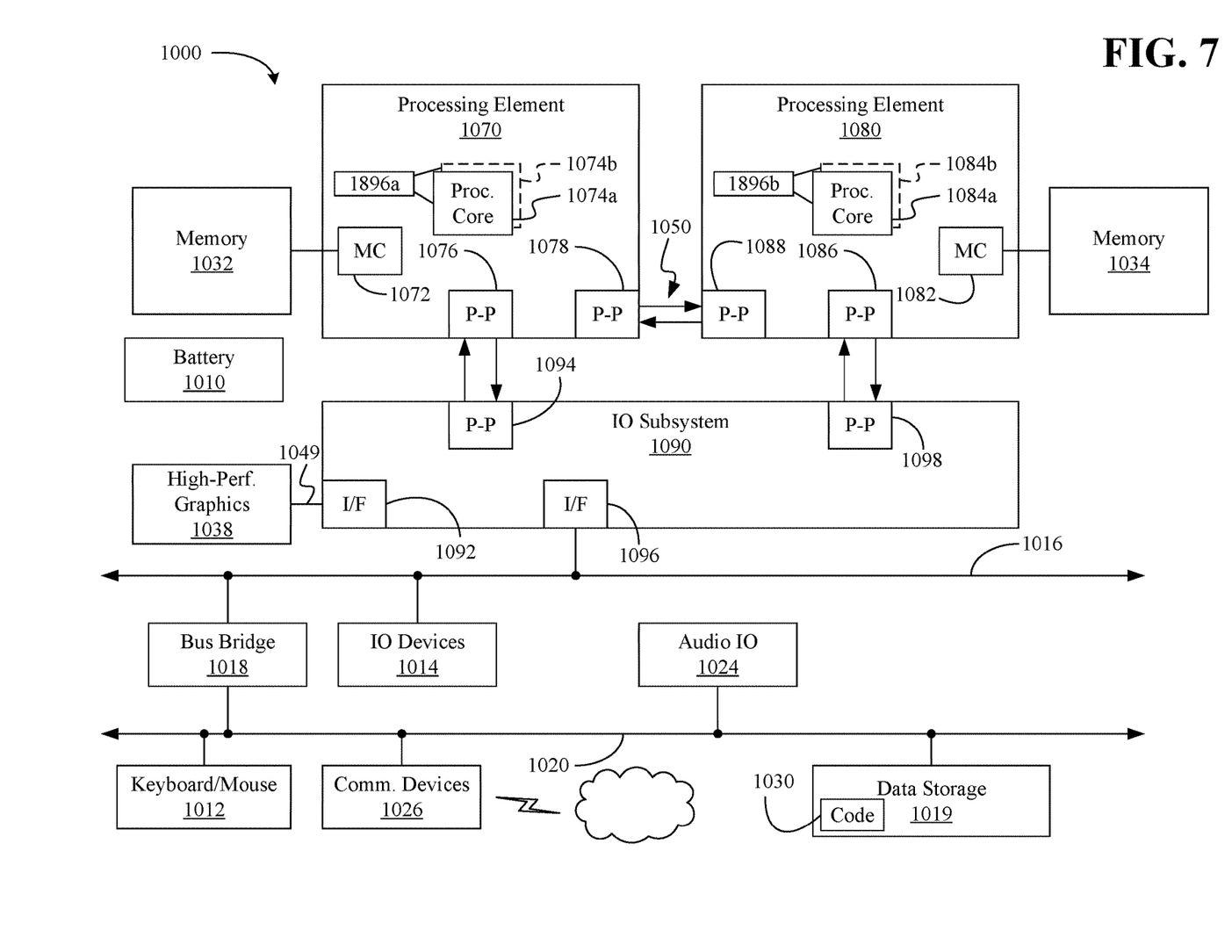
FIG. 7 is a block diagram of an example of a multi-processor based computing system according to an embodiment.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 50 (FIG. 2), the method 60 (FIG. 3A), the method 74 (FIG. 3B), the method 88 (FIG. 3C), the method 108 (FIG. 3D), and/or the method 142 (FIG. 3E), already discussed. Further, an audio I/O 1024 may be coupled to second bus 1020 and a battery 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include a computing device comprising non-volatile memory including firmware, and a system on chip (SOC) including a plurality of microcontrollers and a trusted region, the trusted region including logic to assume, by a root of trust located in the trusted region, control over a reset of the SOC, conduct, by the root of trust, an authentication of an update package in response to an update condition, and apply, by the root of trust, the update package to the firmware if the authentication is successful.

Example 2 may include the computing device of Example 1, wherein the control over the reset is assumed from an operating system of the SOC, and wherein the instructions, when executed, cause the computing device to transfer control over the reset back to the operating system via system firmware in response to the update package being successfully applied.

Example 3 may include the computing device of Example 1, wherein the update condition includes one or more of an update flag or a recovery flag being set.

Example 4 may include the computing device of Example 3, wherein the logic is to clear, by the root of trust, one or more of the update flag or the recovery flag in response to the update package being successfully applied to the firmware.

Example 5 may include the computing device of Example 1, further comprising a boot media that includes an operating system of the SOC and a partition containing the update package, wherein the logic is to retrieve, by the root of trust, the update package from the partition.

Example 6 may include the computing device of any one of Examples 1 to 5, wherein the logic is to accelerate, by the root of trust, application of the update package to the firmware in response to the firmware being designated as boot critical firmware.

Example 7 may include a semiconductor apparatus comprising one or more substrates, and logic coupled to the one or more substrates, wherein the logic is implemented in one or more of configurable logic or fixed-functionality hardware logic, the logic coupled to the one or more substrates to assume, by a root of trust located in a trusted region of a system on chip (SOC), control over a reset of the SOC, conduct, by the root of trust, an authentication of an update package in response to an update condition, and apply, by the root of trust, the update package to firmware located in non-volatile memory associated with a microcontroller of the SOC if the authentication is successful.

Example 8 may include the apparatus of Example 7, wherein the control over the reset is assumed from an operating system of the SOC, and wherein the logic coupled to the one or more substrates is to transfer control over the reset back to the operating system via system firmware in response to the update package being successfully applied.

Example 9 may include the apparatus of Example 7, wherein the update condition includes one or more of an update flag or a recovery flag being set.

Example 10 may include the apparatus of Example 9, wherein the logic coupled to the one or more substrates is to clear, by the root of trust, one or more of the update flag or the recovery flag in response to the update package being successfully applied to the firmware.

Example 11 may include the apparatus of Example 7, wherein the logic is to retrieve, by the root of trust, the update package from a partition in a boot media that contains an operating system of the SOC.

Example 12 may include the apparatus of any one of Examples 7 to 11, wherein the logic is to accelerate, by the root of trust, application of the update package to the firmware in response to the firmware being designated as boot critical firmware.

Example 13 may include the apparatus of any one of Examples 7 to 11, wherein the logic coupled to the one or more substrates includes transistor channel regions that are positioned within the one or more substrates.

Example 14 may include at least one computer readable storage medium comprising a set of instructions, which when executed by a computing device, cause the computing device to assume, by a root of trust located in a trusted region of a system on chip (SOC), control over a reset of the SOC, conduct, by the root of trust, an authentication of an update package in response to an update condition, and apply, by the root of trust, the update package to firmware located in non-volatile memory associated with a microcontroller of the SOC if the authentication is successful.

Example 15 may include the at least one computer readable storage medium of Example 14, wherein the control over the reset is assumed from an operating system of the SOC, and wherein the instructions, when executed, cause the computing device to transfer control over the reset back to the operating system via system firmware in response to the update package being successfully applied.

Example 16 may include the at least one computer readable storage medium of Example 14, wherein the update condition includes one or more of an update flag or a recovery flag being set.

Example 17 may include the at least one computer readable storage medium of Example 16, wherein the instructions, when executed, cause the computing device to clear, by the root of trust, one or more of the update flag or the recovery flag in response to the update package being successfully applied to the firmware.

Example 18 may include the at least one computer readable storage medium of Example 14, wherein the instructions, when executed, cause the computing device to retrieve, by the root of trust, the update package from a partition in a boot media that contains an operating system of the SOC.

Example 19 may include the at least one computer readable storage medium of any one of Examples 14 to 18, wherein the instructions, when executed, cause the computing device to accelerate, by the root of trust, application of the update package to the firmware in response to the firmware being designated as boot critical firmware.

Example 20 may include a method comprising assuming, by a root of trust located in a trusted region of a system on chip (SOC), control over a reset of the SOC, conducting, by the root of trust, an authentication of an update package in response to an update condition, and applying, by the root of trust, the update package to firmware located in non-volatile memory associated with a microcontroller of the SOC if the authentication is successful.

Example 21 may include the method of Example 20, wherein the control over the reset is assumed from an operating system of the SOC, and wherein the method further includes transferring control over the reset back to the operating system via system firmware in response to the update package being successfully applied.

Example 22 may include the method of Example 20, wherein the update condition includes one or more of an update flag or a recovery flag being set.

Example 23 may include the method of Example 22, further including clearing, by the root of trust, one or more of the update flag or the recovery flag in response to the update package being successfully applied to the firmware.

Example 24 may include the method of Example 20, further including retrieving, by the root of trust, the update package from a partition in a boot media that contains an operating system of the SOC.

Example 25 may include the method of any one of Examples 20 to 24, further including accelerating, by the root of trust, application of the update package to the firmware in response to the firmware being designated as boot critical firmware.

Thus, technology described herein may support in-field seamless recovery and boot resiliency. The technology may also enable a simpler, more secure, and more scalable firmware update solution within the SOC root of trust. Additionally, the technology described herein saves BOM cost by leveraging the high capacity of secondary storage disks in the pre-firmware environment while providing high boot firmware reliability and functional safety. Moreover, the technology provides fast full firmware by performing the update in the ROM prior to system firmware execution and reducing the occurrence of system resets. In addition, an option is provided to reduce tool cost and time on the manufacturing line and update the system firmware as part of the first boot of the system.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing device comprising:
   non-volatile memory including firmware; and
   a system on chip (SOC) including a plurality of microcontrollers and a trusted region, the trusted region including logic instructions to:
      assume, via a root of trust, control over a reset of the SOC, wherein the root of trust is implemented in the trusted region of the SOC to prevent corruption,
      conduct an authentication of an update package in response to an update condition, wherein the authentication includes determining boot critical portions and non-boot critical portions of the update package, and
      apply the boot critical portions of the update package to the firmware if the authentication is successful, wherein the root of trust is to accelerate application of the update package to the firmware in response to the firmware being designated as boot critical firmware.

2. The computing device of claim 1, wherein the control over the reset is assumed from an operating system of the SOC, and wherein the logic instructions, when executed, cause the computing device to transfer control over the reset back to the operating system via system firmware in response to the update package being successfully applied.

3. The computing device of claim 1, wherein the update condition includes one or more of an update flag or a recovery flag being set.

4. The computing device of claim 3, wherein the logic instructions are to clear one or more of the update flag or the recovery flag in response to the update package being successfully applied to the firmware.

5. The computing device of claim 1, further comprising a boot media that includes an operating system of the SOC and a partition containing the update package, wherein the logic is to retrieve the update package from the partition.

6. A semiconductor apparatus comprising:
   one or more substrates; and
   logic coupled to the one or more substrates, wherein the logic is implemented in one or more of configurable logic or fixed-functionality hardware logic, the logic coupled to the one or more substrates to:
      assume, via a root of trust, control over a reset of a system on chip (SOC), wherein the root of trust is implemented in a trusted region of the SOC to prevent corruption;
      conduct an authentication of an update package in response to an update condition wherein the authentication includes determining boot critical portions and non-boot critical portions of the update package; and
      apply the boot critical portions of the update package to firmware located in non-volatile memory associated with a microcontroller of the SOC if the authentication is successful, wherein the root of trust is to accelerate application of the update package to the firmware in response to the firmware being designated as boot critical firmware.

7. The apparatus of claim 6, wherein the control over the reset is assumed from an operating system of the SOC, and wherein the logic coupled to the one or more substrates is to transfer control over the reset back to the operating system via system firmware in response to the update package being successfully applied.

8. The apparatus of claim 6, wherein the update condition includes one or more of an update flag or a recovery flag being set.

9. The apparatus of claim 8, wherein the logic coupled to the one or more substrates is to clear one or more of the update flag or the recovery flag in response to the update package being successfully applied to the firmware.

10. The apparatus of claim 6, wherein the logic is to retrieve the update package from a partition in a boot media that contains an operating system of the SOC.

11. The apparatus of claim 6, wherein the logic coupled to the one or more substrates includes transistor channel regions that are positioned within the one or more substrates.

12. At least one non-transitory computer readable storage medium comprising a set of instructions, which when executed by a computing device, cause the computing device to:
    assume, via a root of trust, control over a reset of a system on chip (SOC), wherein the root of trust is implemented in a trusted region of the SOC to prevent corruption;
    conduct an authentication of an update package in response to an update condition wherein the authentication includes determining boot critical portions and non-boot critical portions of the update package; and
    apply the boot critical portions of the update package to firmware located in non-volatile memory associated with a microcontroller of the SOC if the authentication is successful, wherein the root of trust is to accelerate application of the update package to the firmware in response to the firmware being designated as boot critical firmware.

13. The at least one non-transitory computer readable storage medium of claim 12, wherein the control over the reset is assumed from an operating system of the SOC, and wherein the instructions, when executed, cause the computing device to transfer control over the reset back to the operating system via system firmware in response to the update package being successfully applied.

14. The at least one non-transitory computer readable storage medium of claim 12, wherein the update condition includes one or more of an update flag or a recovery flag being set.

15. The at least one non-transitory computer readable storage medium of claim 14, wherein the instructions, when executed, cause the computing device to clear one or more of the update flag or the recovery flag in response to the update package being successfully applied to the firmware.

16. The at least one non-transitory computer readable storage medium of claim 12, wherein the instructions, when executed, cause the computing device to retrieve the update package from a partition in a boot media that contains an operating system of the SOC.

17. A method comprising:
    assuming, via a root of trust, control over a reset of a system on chip (SOC), wherein the root of trust is implemented in a trusted region of the SOC to prevent corruption;
    conducting an authentication of an update package in response to an update condition, wherein the authentication includes determining boot critical portions and non-boot critical Portions of the update package; and
    applying the boot critical portions of the update package to firmware located in non-volatile memory associated with a microcontroller of the SOC if the authentication is successful, wherein the root of trust accelerates application of the update package to the firmware in response to the firmware being designated as boot critical firmware.

18. The method of claim 17, wherein the control over the reset is assumed from an operating system of the SOC, and wherein the method further includes transferring control over the reset back to the operating system via system firmware in response to the update package being successfully applied.

19. The method of claim 17, wherein the update condition includes one or more of an update flag or a recovery flag being set.

20. The method of claim 19, further including clearing one or more of the update flag or the recovery flag in response to the update package being successfully applied to the firmware.

21. The method of claim 17, further including retrieving the update package from a partition in a boot media that contains an operating system of the SOC.

* * * * *